R. H. HAGGARD.
PACKING RING.
APPLICATION FILED APR. 15, 1914.
1,151,265.
Patented Aug. 24, 1915.
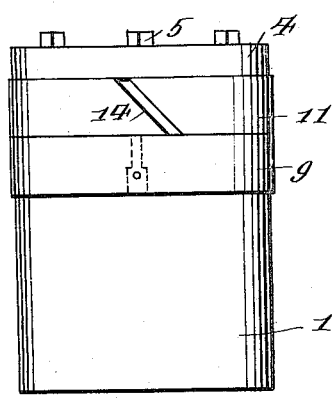
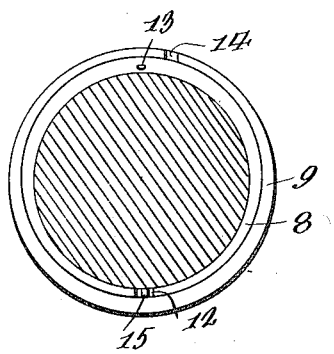
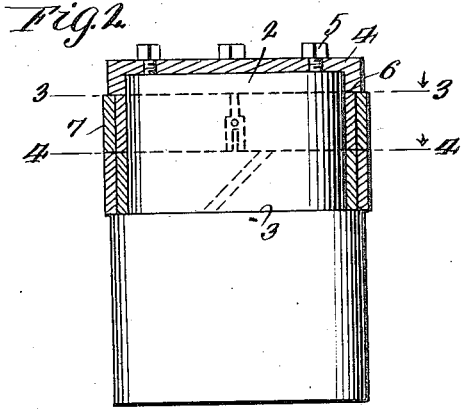
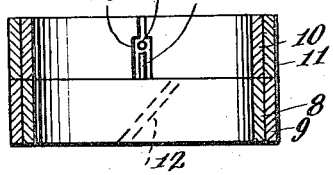
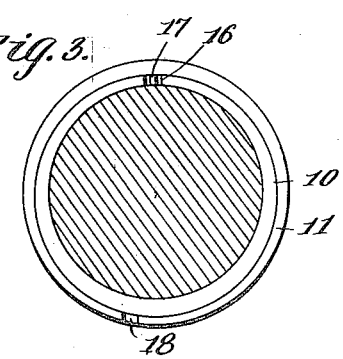
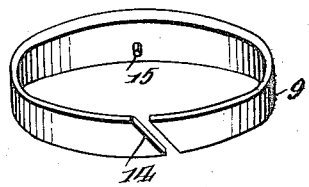
Inventor
Robert H. Haggard.

UNITED STATES PATENT OFFICE.

ROBERT H. HAGGARD, OF ST. CHARLES, MISSOURI, ASSIGNOR OF ONE-HALF TO CASPER H. FUERHOFF, OF ST. CHARLES, MISSOURI.

PACKING-RING.

1,151,265.　　　　Specification of Letters Patent.　　Patented Aug. 24, 1915.

Application filed April 15, 1914.　Serial No. 832,070.

*To all whom it may concern:*

Be it known that I, ROBERT H. HAGGARD, citizen of the United States, residing at St. Charles, in the county of St. Charles and State of Missouri, have invented certain new and useful Improvements in Packing-Rings, of which the following is a specification.

This invention relates to improvements in piston packing rings, and as its primary object aims to provide a packing ring wherein a plurality of interlocking ring sections are so arranged relatively to each other as to prevent, when properly assembled, leakage around the periphery of the piston.

The invention as a further object contemplates a packing ring construction wherein the several ring sections may be assembled without distortion.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is an elevation of a piston provided with my improved formation of piston ring; Fig. 2 is a similar view, the piston ring and piston follower being shown in section; Fig. 3 is a section on the line 3—3 of Fig. 2; Fig. 4 is a section on the line 4—4 of Fig. 2; Fig. 5 is a cross sectional view of the piston ring; Fig. 6 is a detail perspective view of one of the piston ring sections; and Fig. 7 is a similar view of another of the said sections.

Referring now to the drawings by numerals, 1 designates, as an entirety, the piston, said piston being so shaped as to form at one end an extension 2 of a diameter somewhat less than the diameter of the said piston, this construction forming an annular shoulder 3 at a point adjacent one end of the piston. A follower or cap 4 is detachably fastened as indicated at 5 to the extension 2, said cap having a diameter equal to that of the piston proper 1 to form, as illustrated to advantage in Fig. 2 an annular groove or channel 6 within which the piston ring designated as an entirety by the numeral 7 is set or placed. Said ring 7 in its preferred embodiment is composed of a plurality of independent detachable piston rings sections, preferably four in number and designated respectively 8, 9, 10 and 11. Ring section 8 is split or divided as indicated at 12, preferably at an angle, and is provided with a longitudinal pin 13. Ring section 9 is of a size sufficiently large to embrace or encompass the section 8 above noted, said section 9 being likewise divided as indicated at 14, the dividing point or cut being at a point diametrically opposite to the dividing point or cut 12 of said ring 8. Upon reference to Figs. 3 and 4 it is apparent that the ring sections are what might be termed "eccentric," that is, so formed as to increase in thickness from the dividing point or cut therein. A pin 15 projects laterally from the inner periphery of ring section 9, said pin fitting the cut 12 of ring 8 to lock the sections against circumferential movement one independent of the other.

Cap or follower 4 having been removed from extension 2 of piston, rings 8 and 9 are placed, without distortion, over the extension 2 until in engagement with shoulder 3 of the piston. Piston ring sections 10 and 11 are then assembled and placed over the said extension 2 until in engagement with the said sections 8 and 9, in which event, follower 4 is replaced to lock the piston ring 7 within the channel 6 formed in the manner above noted.

Ring section 10 is divided or cut as indicated at 16, said cut receiving the pin 13 of ring 8 and a lateral pin 17 of ring section 11, the latter embracing the section 10 in a manner similar to the arrangement of ring sections 8 and 9 above referred to. Rings 10 and 11 are also eccentric, the latter ring section 11 being divided or cut as at 18 at a point diametrically opposite to the cut 16 of ring 10.

From the foregoing, taken in connection with the accompanying drawings it is apparent that the entire ring 7 may be properly arranged over the extension 2 of the piston without distortion; that the ring sections are so arranged relatively to each other as to interlock and prevent circumferential movement of one section independent of another; and that by the provision of the removable follower 4, a channel 6 is formed between which the packing ring 7 is set, such arrangement preventing longitudinal movement of the ring upon the piston.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In combination, a piston reduced at one end to provide an abutment shoulder, a plurality of packing rings arranged in pairs and to encircle the reduced portion of the piston, the rings constituting the respective pairs being fitted one within the other, one pair of rings abutting the shoulder aforesaid, the remaining pair abutting the pair first mentioned, each pair of rings fitting one within the other being eccentrically arranged, means precluding relative circumferential movement of the rings constituting each pair, means precluding relative circumferential movement of the respective pairs, means including a cap member adapted for arrangement over the reduced terminal of the piston to abut the rings and serve with the shoulder as the retaining means therefor, and fastening means for the cap.

In testimony whereof I affix my signature in presence of two witnesses.

ROBERT H. HAGGARD.

Witnesses:
J. W. WILSON,
JOHN H. DUCKER.